(12) United States Patent
Lilge

(10) Patent No.: US 7,340,436 B1
(45) Date of Patent: Mar. 4, 2008

(54) COMMUNICATION NETWORK CHARGING METHOD AND SYSTEM

(75) Inventor: Manfred Lilge, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 944 days.

(21) Appl. No.: 10/129,054

(22) PCT Filed: Jul. 18, 2000

(86) PCT No.: PCT/DE00/02334

§ 371 (c)(1),
(2), (4) Date: Apr. 29, 2002

(87) PCT Pub. No.: WO01/33800

PCT Pub. Date: May 10, 2001

(30) Foreign Application Priority Data

Oct. 29, 1999 (DE) ................................. 199 52 345

(51) Int. Cl.
*G06Q 99/10* (2006.01)
*H04K 1/00* (2006.01)
*H04L 9/00* (2006.01)

(52) U.S. Cl. .......................... 705/53; 705/80; 705/77; 705/1; 709/223

(58) Field of Classification Search ............... None
See application file for complete search history.

(56) References Cited

U.S. PATENT DOCUMENTS 5,917,537 A * 6/1999 Lightfoot et al. ............. 725/4
6,199,076 B1 * 3/2001 Logan et al. ............. 715/501.1
6,282,293 B1 * 8/2001 Itoh et al. .................... 380/233
6,377,938 B1 * 4/2002 Block et al. ................. 705/32
6,427,140 B1 * 7/2002 Ginter et al. ................ 705/80
6,480,485 B1 * 11/2002 Kari et al. ................... 370/352
6,611,582 B2 * 8/2003 Book et al. ............. 379/114.28

FOREIGN PATENT DOCUMENTS

| DE | 19723382 A1 | 12/1998 |
| DE | 19742858 A1 | 4/1999 |
| JP | 11074882 A | 3/1999 |
| WO | WO 97/26739 | 7/1997 |
| WO | WO 98/56202 | 12/1998 |
| WO | WO 99/21350 | 4/1999 |
| WO | WO 99/29065 | 6/1999 |
| WO | WO00/13370 | 3/2000 |

* cited by examiner

*Primary Examiner*—Florian R. Zeender
*Assistant Examiner*—Luna Champagne
(74) *Attorney, Agent, or Firm*—Bell, Boyd & Lloyd LLP

(57) ABSTRACT

A method and system for changing subscribers in communications networks. In communications networks, more and more information providers (referred to as content providers) are making available WML/HTML pages (data contents) on their servers which subscribers can request and download onto their terminal. The present invention is directed to a method and a system which charges information transmitted via a communications network on the basis of its content. The criteria for classifying a WML page in a billing system are the information provider's. A "WAP gateway" constitutes the interface between the subscriber and the WAP data world or Internet data world. All the WML/HTML/XML content called by subscribers passes through a WAP gateway. According to the present invention, a network unit responds to the charging inquiries for subscribers.

10 Claims, 3 Drawing Sheets

COMMUNICATION NETWORK CHARGING METHOD AND SYSTEM

In communications networks, more and more information providers, referred to as content providers, are making available information (data contents) on their servers which can be requested by subscribers from the communications network and downloaded onto their terminal. This can be data of any kind, for example cinema programs, travel schedule information and so on. This information is often available on the Internet as HTML pages, WML pages and increasingly also as XML pages (referred to below only as WML pages).

For small mobile terminals (for example mobile telephones, hand-held or palmtop computers, pagers etc.) there are special requirements owing to restrictions on memory space and displays. For the associated "microbrowsers" which run under WAP (Wireless Application Protocol), this information is prepared as WML pages: the "wireless markup language" is a language which has been developed specially for mobile terminals with small display devices with limited capabilities. Users of mobile WAP-enabled terminals can also call this information by inputting the respective address (URL).

The creation, maintenance, administration and provision of the data pages (in particular the updating of the stored information) gives rise to costs which should be partially borne by subscribers who access this data.

It is generally known that contemporary mechanisms charge for the time period for which a data link is set up to a server. More recent approaches charge for the volume of data transmitted.

Information providers (content providers) on the Internet often cover the costs which they incur through advertising. Their HTML pages contain a series of advertising banners and logos which, when they are clicked on, lead to the home pages of the respective product providers. Users which access the pages of the content providers see this advertisement in addition to the desired information.

This solution cannot be applied in particular to WML pages owing to the restricted possibilities of WAP terminals. At present, no solution to this problem is known.

SUMMARY OF THE INVENTION

The present invention is directed to a method and a system for charging for the transmission of information which avoids the above mentioned disadvantages.

The criteria for classifying a WML page in a billing system or for defining a price are the information provider's (content provider). This content provider knows which information which is made available is "expensive" and which is "cheaper". One objective of the content provider is to characterize the pages which can be called from a server by means of additional billing or price information. In one embodiment of the invention, this information is concealed in the WML page (for example as an independent WML tag) or in the header of the respective HTTP message and is transmitted to the subscriber when the information is called.

A "WAP gateway" constitutes the interface between the subscriber and the WAP data world or Internet data world. All the WML/HTML content which is called by subscribers passes through a WAP gateway (HTLM data pages can be converted into WML here). The WAP gateway has the additional function of searching in the data pages for billing information stored there. Toll-free pages do not contain any tolls and can pass through the gateway. If billing information is found, the gateway submits a charging request to a network unit which responds to charging inquiries for subscribers. If the charging request is acknowledged positively, the subscriber pays for the data content and the gateway can allow the page to pass. If there is a negative acknowledgement, the content is discarded and the subscriber is informed of this.

Alternatively, a database relating to the WML pages to be charged for can be stored on the WAP gateway. For these pages, their URL and billing or price information is stored. When a subscriber accesses such a WML page, the WAP gateway submits a respective charging request by reference to the stored information. URLs for which no entry can be found in the database, are free of charge and can pass through the WAP gateway.

The present invention may include a network unit which responds to charging requests for subscribers (also referred to below as "payment broker"). In one embodiment an individual profile is set up for each subscriber. The profile may contain information on:

Account information by means of which the charging requests can be billed (credit card, bank information, telephone account, prepaid account . . . ).

Rules stipulating how charging requests are to be replied to. These rules can be dependent on a plurality of criteria (the amount of the charging request, balance of the account, information provider, total of all the charging requests within a time period . . . ). On the basis of these rules, the "payment broker" can respond to the charging inquiry independently or in a preferred embodiment of the invention, it asks the subscriber beforehand whether he is ready to pay for the WML page.

Conversion tables for converting abstract billing information into specific amounts of money taking into account, for example, personal discounts, special offers, discounts for heavy usage.

If the "payment broker" responds to the charging request positively, the payment of the WML content is secured. The operator of the payment broker draws the funds for the charges and passes them onto the "content provider".

In another embodiment of the present invention, a profile for each information provider (content provider) can be created. The profile may contain information on:

Preferred payment (for example customers may pay only using a credit card).

The collection method negotiated between the operator of the payment broker and the content provider (for example time of submission of invoice).

Restrictions which the operator of the payment broker faces on the content provider (temporary exclusion from the collection method, upper limit for individual payment transactions . . . ).

In yet another embodiment of the present invention, a number of tasks may be provided:

The information provider only has to be concerned with the provision of the contents and the level of billing or pricing of the contents. The information provider is freed of the need to write invoices and to collect the amounts of money.

The WAP gateway has access to the content of the transmitted data and controls its transfer.

The "payment broker" is concerned with charging aspects in an overall view of the subscriber. A subscriber profile which is set up at the "payment broker" can be used for further applications. Sensitive account data only has to be stored once at the "payment broker" by the subscriber and is not passed onto third parties.

One advantage of the present invention is that information which is not desired by the subscriber, such as advertising banners, is not transmitted.

The information provider can charge for what he provides in a way which corresponds to the actual costs, irrespective of the terminal used by the subscriber.

Additional features and advantages of the present invention are described in, and will be apparent from, the following Detailed Description of the Invention and the Figures.

DETAILED DESCRIPTION OF THE INVENTION

In one embodiment of the present invention an internet solution performs the role of the "payment broker". The "WAP gateway" submits all the charging requests to the IN system via an interface which is still to be defined.

Figure 1:
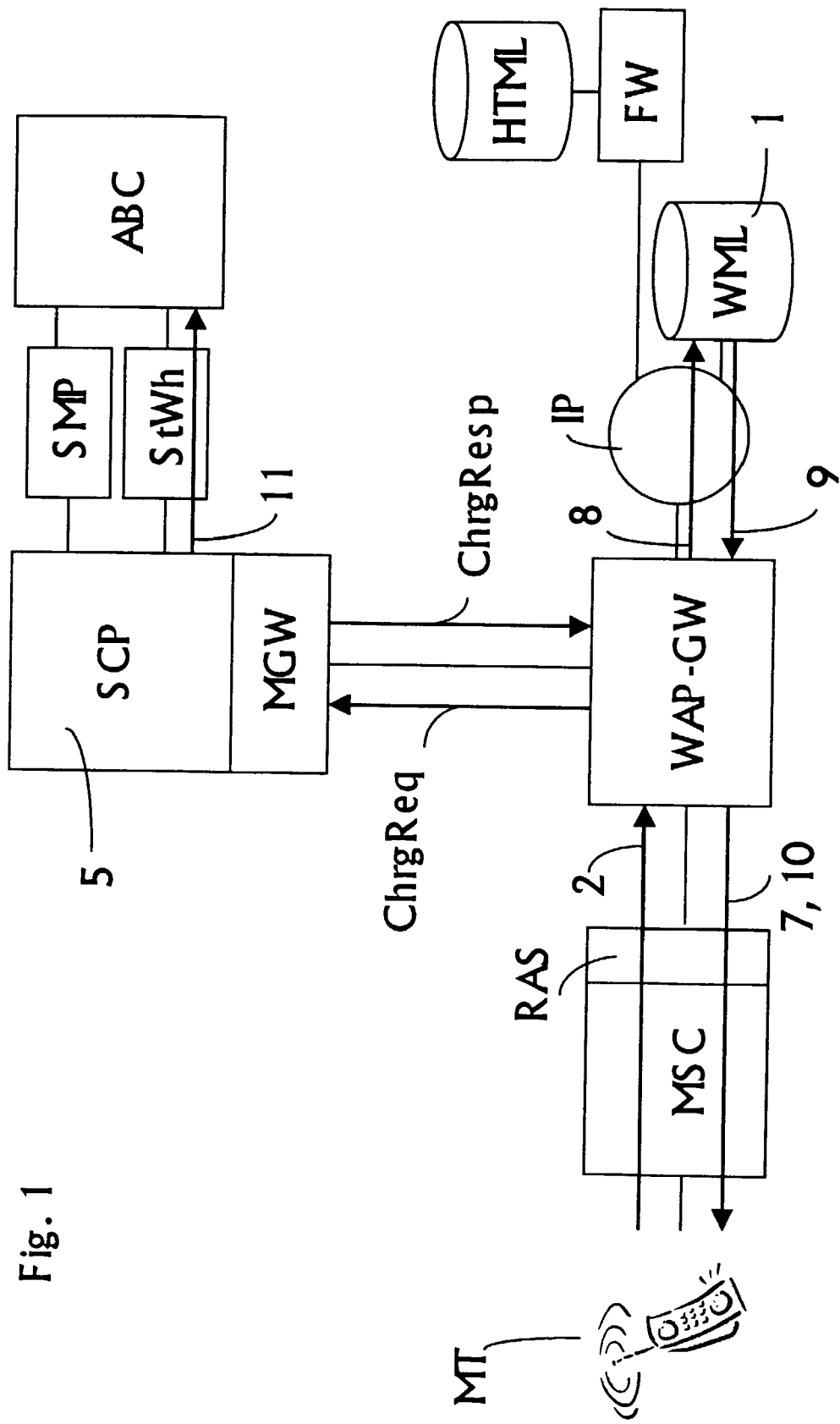
FIG. 1 shows the charging controlled by a charging agent ("URL-based charging").

FIG. 1 shows the charging controlled by a charging agent ("URL-based charging"). The communications network contains a switching center (MSC), in this embodiment the MSC suitable for use in mobile telephone networks. Via this switching center, a subscriber requests information from a content provider via his mobile terminal, MT. This information is present in the form of data pages, for example in the HTML or WML language which has been developed for mobile terminals with a small memory and a small display capacity.

The manner in which these data pages HTML, WML are stored, the location at which they are stored and the physical path on which they are accessed (for example via Intranet or Internet, IP, and access protection measures such as firewalls FW) are without significance for the procedure according to the present invention.

In order to transfer the data from a voice network into a packet network, and vice versa, there is a device RAS whose method of operation corresponds to that of a modem.

In the preferred embodiment of the present invention, the technical implementation of the invention is described by means of an intelligent network (see also the ITU Standards Q.1200 et seq.). In another embodiment, the service controller SCP may contain a protocol converter MGW.

The service center of a management entity or management entities SMP, StWh which permit the service operator and content provider to access the system are supported. Here the statistical data is evaluated and the charge data for the operator is administered.

Data pages to be charged for are stored in a way which permits the WAP gateway to access them 1. The WAP gateway receives all the information requests entered by the subscriber 2 (for example in the form of the address at which the information which is sought can be found, such as what is referred to as a unified resource locator URL address). The WAP gateway checks the requested addresses 3: if these are not to be charged for, the requests (and the data pages which are supplied in return) can pass through the WAP gateway unimpeded.

In another embodiment of the present invention charging is provided for the transmission of the information. In this embodiment, a request ChrgReq to the service center SCP is generated from the information request of the subscriber 1 and from the page's own stored information. The request ChrgReq contains:

a user identifier (subscriber ID), the identifier of the information provider (content provider ID), an identifier of the content to be charged for (content ID), charge event.

The service center calculates on the basis of the request ChrgReq call and the data known to it a response ChrgResp as well as statistical data and possibly occurring charge records for subscribers which have agreed prepayment, 5. The response then may contain a request for further processing (acceptance or rejection) and a reason.

In one embodiment of the present invention, the WAP gateway generates rejection information ("access denied") 7 for the subscriber. This rejection information can in turn contain any information, for example the reason for the rejection.

If the WAP gateway permits the request to pass to the content provider 8 requested information (data page) is supplied from the server to the subscriber 9, 10.

For subscribers with which prepayment (see above) has not been agreed (postpaid subscribers), the charging is now carried out and charge records are generated (call data records, 11).

Figure 2:
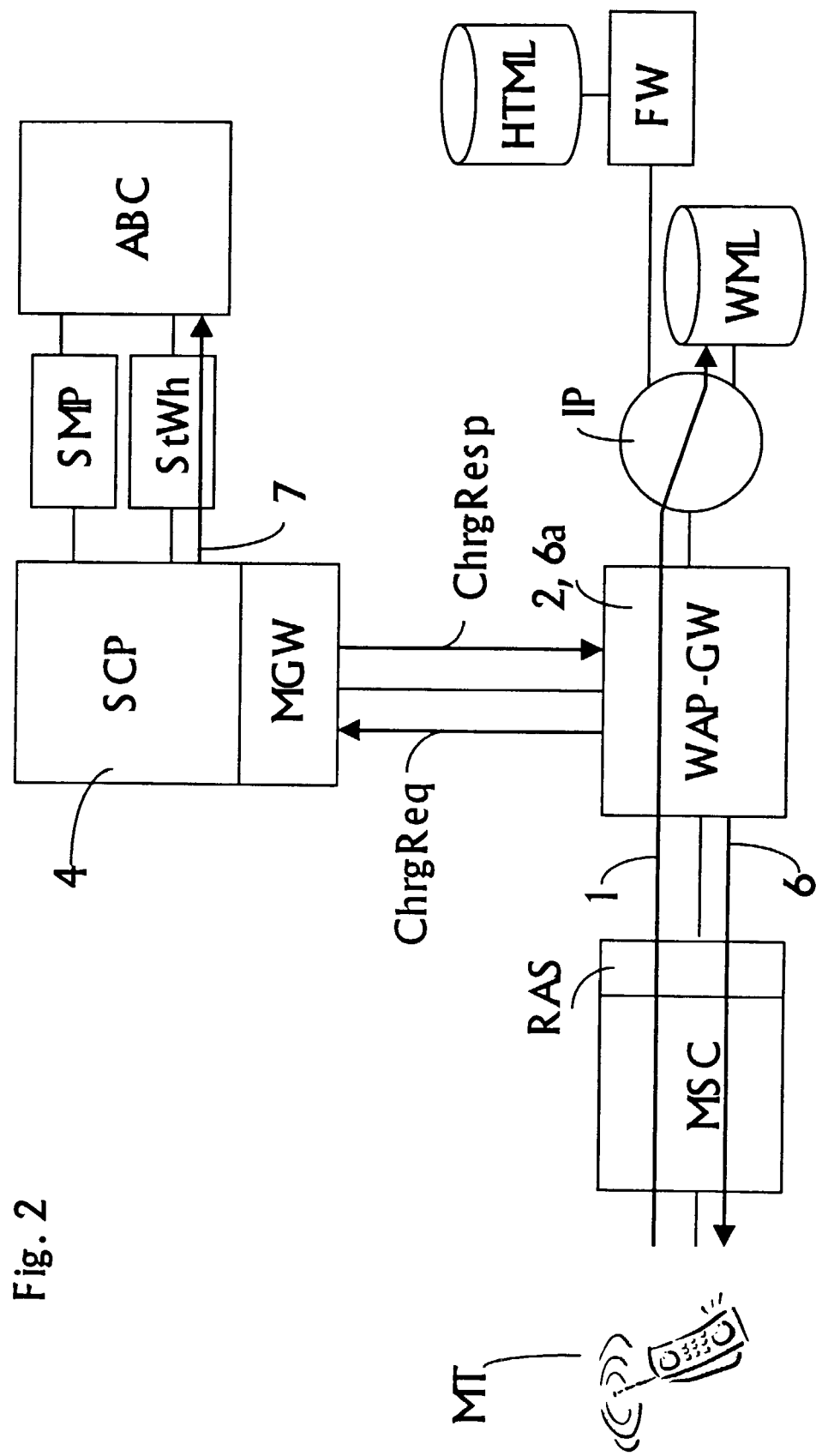
FIG. 2 shows the charging controlled by charge information which is supplied along with the information which is to be charged for ("tag-based charging").

FIG. 2 shows the charging controlled by charge information ("tag-based charging") which is supplied along with the information to be charged for. The represented communications network corresponds in these elements to those of FIG. 1.

For each transmissible information unit (data pages), the content provider must define the level of the transmission charges calculated for said unit. This is then assigned, like a tag, to the respective information unit (in the WML or HTML database). This charge information can also be defined, for example, in HTML or WML in this context.

If the subscriber MT then requests a data page through his access interface (WAP-GW), 1, this data page is searched for in accordance with charge information contained in it, 2. A request (ChrgReq) is transmitted to the service center (SCP) which may request the following information:

subscriber ID content provider ID content description charge event.

The service center can check whether the subscriber is ready and/or capable of accepting the charge-incurring information, 4: he has, for example, paid in advance (prepaid account) and there is no longer sufficient money present on the subscriber account. Furthermore, the service center will collect statistical data (with and for a management entity SMP).

A response (ChrgResp) is generated which contains the result of the check, and if appropriate a reason.

Depending on the response, a message to the subscriber is generated, such as when there is a negative result of the check, the originally requested data page, if already released by the access interface, and corresponding information is transmitted, which may have the content "access denied" to the subscriber 6.

If the result of the check is positive, the charge information can optionally be removed by the access interface before the transmission of the data page to the subscriber, 6a.

Figure 3:
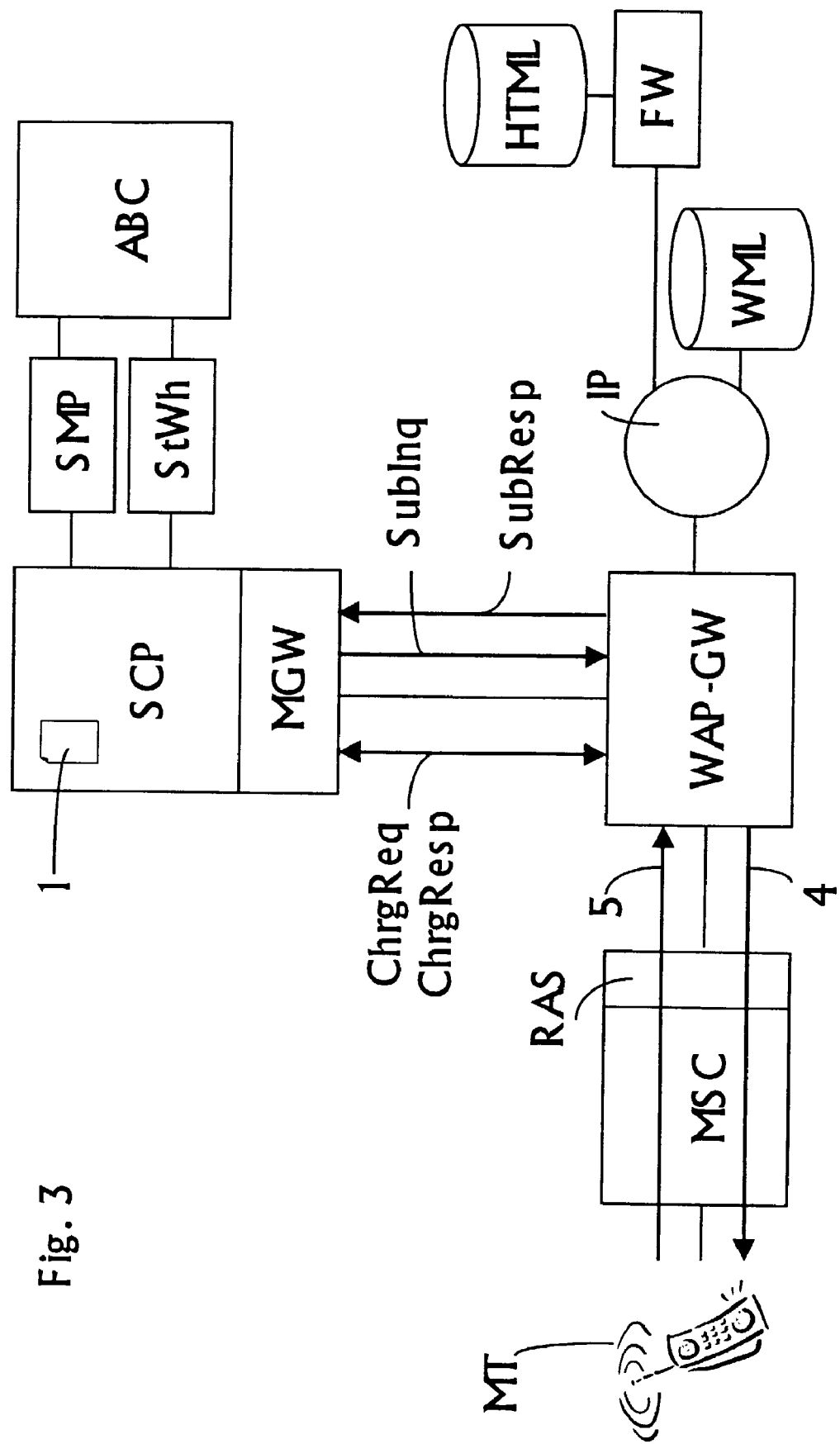
FIG. 3 shows the charging controlled by a subscriber profile and an optional agreement inquiry to the subscriber ("automatic charge processing, manual charge confirmation").

The SCP processes and responds to the charge request on the basis of the stored subscriber profile, 1, see FIG. 3.

Evaluation criteria may be:
amount of the prep aid account
amount of the individual charge/sum of the charges
content
content provider.

In yet another embodiment of the present invention, a request can be started at the subscriber end. To do this, the service center SCP requests the interface, SubInq, to generate information (for example in the form of a data page) which contains the charge information and to transmit it to the subscriber, 4.

The subscriber can respond to this request, 5, for example by activating a knob on the transmitted data page, and thus confirm the transmission of the desired information, or else abort it.

The response of the subscriber, SubResp, is then transmitted to the service center SCP.

Debits can be made directly from the account of prepaid subscribers, and for postpaid subscribers a record (in IN terminology a CDR: Call Data Record) is written which is processed by the billing center ABC of the operator for the monthly telephone bill. Interfaces to banking and credit card institutions permit the respective accounts to be debited.

The implementation can be implemented, for example, by means of the INXpress system provided by Siemens.

It should be understood that various changes and modification to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method for charging for transmission of information in a communications network, the method comprising:
    (a) providing an interface through which the information is transmitted, and which controls access to and transfer of the information, a level of the charging being dependent on content of the information to be transmitted;
    (b) causing the interface to generate a request to a central entity in the network, the central entity to request charges of a subscriber in the communications network;
    (c) enabling the central entity to decide based upon the information contained in the request, information relating to the subscriber and an information provider which is available to the central entity, to accept or reject the charge-incurring transmission of the information; and
    (d) reporting a decision of the central entity to the interface,
    wherein when the subscriber calls for information, and the central entity accepts the transmission, the charge information is transmitted to the subscriber before the transmission of the called for information, and the subscriber is enabled to accept or reject the transmission of information.

2. The method of claim 1, wherein the transmission of information is permitted or rejected by the interface as a function of the information provided by the central entity.

3. The method of claim 1, wherein the information to be transmitted contains a level of charges for the transmission.

4. The method of claim 1, wherein the interface uses additional stored charging information relating to the information to be transmitted, the information including a level of charging.

5. The method of claim 1, the method further comprising the steps of selecting desired information by specifying an address.

6. The method of claim 1, wherein the information is present in a special description language.

7. A system for charging for transmission of information in communications networks, comprising:
    at least one source for information to be transmitted;
    a charging entity in the communications network to which information relating to charge billing of communications subscribers is available, wherein the charging entity provides a response accepting or rejecting the at least one source of information; and
    an interface entity which receives an information request of a subscriber, generates a request to the charging entity, the request being composed of subscriber data of the information request and content-dependent charge data of the requested information, and controls the transmission of the information from the source to the subscriber as a function of a response of the charging entity,
    wherein, when the subscriber requests information, the charge data is transmitted to the subscriber before the transmission of the requested information, and the subscriber is enabled to accept or reject the transmission of information.

8. The system of claim 7, wherein the content-dependent charge data is contained in the information.

9. The system of claim 7, wherein the content-dependent charge data is stored in the interface entity.

10. The system of claim 7, wherein when there is a negative response to the charging entity by the interface entity, rejection information is transmitted to the subscriber.

* * * * *